United States Patent Office 2,967,096
Patented Jan. 3, 1961

2,967,096
GLASS POLISHING COMPOSITIONS

Gerhard Kroner, Krefeld-Uerdingen, Germany, assignor to Farbenfabriken Bayer Aktiengesellschaft, Leverkusen, Germany, a corporation of Germany No Drawing. Filed Mar. 11, 1958, Ser. No. 720,535

Claims priority, application Germany Mar. 13, 1957

2 Claims. (Cl. 51—307)

The present invention is concerned with improvements in or relating to glass polishing compositions.

It is known in the art to add acid agents such as sulphuric acid, aluminium sulphate, iron (II)-sulphate, copper sulphate, zinc sulphate, cadmium sulphate, chromium(II)-sulphate, cobalt sulphate, manganous sulphate, nickel(II)-sulphate, tin(II)-sulphate and zinc chloride, to glass polishing compositions comprising aqueous suspensions of finely divided granular materials such as finely divided silicic acid and zirconium silicate. These admixtures, except the sulphuric acid, however, have the disadvantage that they give rise to the appearance of the colloidal precipitates during the polishing by hydrolysis under the action of the basic constituents of the glass and eventually the action of the air. These colloidal precipitates easily clog up and harden the polishing pads. On the other hand, the sulphuric acid may only be added to the aqueous suspensions but not to the dry powdered glass polishing materials.

Now, I have found that finely divided granular materials suitable as glass polishing agents, especially iron (III)-oxide, furthermore, cerium and zirconium oxide and the above mentioned silicium oxide or zirconium silicate, in the form of dry powders do not have the disadvantages mentioned above if they contain a small quantity of acidifying salts which in aqueous suspension or solution do not produce colloidal precipitates by hydrolysis.

Suitable acidifying salts are, for example, acid sulphates, such as sodium, potassium and ammonia bisulphate, as well as ammonium chloride.

In general, very small additions of such salts suffice. Thus, for example, a good effect is achieved by an addition of about 0.05 percent to 0.5 percent by weight of such salts.

The salt, which is preferably finely ground, can be mixed with the polishing compound in a dry state. For use, such a mixture is then stirred in a known manner with water to give a paste or suspension. However, it is also possible to add the salts to already prepared polishing pastes.

The following example is given for the purpose of illustrating the invention:

Example 100 kilograms of an iron oxide suitable as a glass polishing means is mixed with 0.2 kilogram of sodium bisulphate. This mixture is stirred up in 620 litres of water.

The polishing of glass with such a suspension takes only about half as long as with the use of the same iron oxide suspension without the addition of sodium bisulphate.

Practically the same effect is achieved if the sodium bisulphate is replaced by the same amount of, for example, potassium or ammonium bisulphate or ammonium chloride. Such salts can also be added to other known polishing means such as, for example, cerium or xirconium oxide, with a similar result.

In any case colloidal precipitates do not appear during the polishing, and the polishing pads remain clean.

I claim:

1. An improved method for polishing glass comprising using an aqueous suspension of a mixture of an acidifying salt selected from the group consisting of sodium bisulphate, potassium bisulphate, and ammonium bisulphate with a glass polishing agent selected from the group consisting of iron oxide, cerium oxide, zirconium oxide, silicium oxide and zirconium silicate, said mixture containing about .05 to 0.5% of acidifying salt by weight of the total mixture, and polishing glass with said squeous suspension.

2. A finely divided glass polishing composition for use in an aqueous suspension and consisting essentially of a member selected from the group consisting of iron oxide, cerium oxide, zirconium oxide, silicium oxide and zirconium silicate, and a member selected from the group consisting of sodium bisulphate, potassium bisulphate, and ammonium bisulphate, said latter member being present in the composition in an amount from 0.05 to 0.5% by weight of the composition.

References Cited in the file of this patent

UNITED STATES PATENTS

| | | |
|---|---|---|
| 97,439 | Pettee | Nov. 30, 1869 |
| 538,568 | Westphal | Apr. 30, 1895 |
| 788,132 | Glynn | Apr. 25, 1905 |
| 2,016,892 | Clarvoe | Oct. 8, 1935 |
| 2,101,947 | Kinzie | Dec. 14, 1937 |